US007552058B1

(12) United States Patent
Zhang

(10) Patent No.: US 7,552,058 B1
(45) Date of Patent: Jun. 23, 2009

(54) MANUAL TRIGGERING OF AUTOMATED REPORTING OF DO-NOT-CALL LIST VIOLATION

(75) Inventor: Boaquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 906 days.

(21) Appl. No.: 10/841,738

(22) Filed: May 6, 2004

(51) Int. Cl.
*G06F 17/60* (2006.01)
*H04M 3/42* (2006.01)
*H04M 1/66* (2006.01)

(52) U.S. Cl. .......................... 705/1; 379/200; 379/249; 379/88.19; 379/210; 379/188; 379/196

(58) Field of Classification Search ....................... 705/1
See application file for complete search history.

(56) References Cited

U.S. PATENT DOCUMENTS

| 2001/0033643 | A1 | 10/2001 | Mulvey et al. |
| 2003/0212566 | A1 | 11/2003 | Fergusson et al. |
| 2004/0114747 | A1 | 6/2004 | Trandal et al. |

OTHER PUBLICATIONS

Michael Himowitz, "Do-not-call registries might pay off", Mar. 31, 2003, Los Angeles Times—Washing Post News Service, Tulsa World, p. A. 11.*
"Phone Customers Falling in Love With Caller ID", Aug. 24, 1999, The Associated Press, Evansville Courier and Press, p. B.6.*
"Information for Consumers", accessed through archive.org with an effective date of Aug. 1, 2003, http://web.archive.org/web/20030801081541/http://donotcall.gov/FAQ/FAQConsumers.aspx, pp. 1-14.*
Snap shot of Wikipedia showing SS7 (pp. 1-7).*
FCC Consumer Advisory, "Do-Not-Call Rules—What Consumers Can Do", Oct. 10, 2003.
National Do Not Call Registry, How to File a Complaint and Frequently Asked Questions (Mar. 2004).
Electronic Privacy Information Center, Comments Re: Rules and Regulations Implementing Telephone Consumer Protection Act of 1991 (Dec. 9, 2002).
SS7 Tutorial (2 pages) (date unknown).
Selected AIN Triggers in a SIP Environment Telecordia, Dec. 2001 (2 pages).
ISDN User Part (ISUP) tutorial, pp. 1-7 (date unknwon).

* cited by examiner

*Primary Examiner*—John G. Weiss
*Assistant Examiner*—Matthew L. Brooks

(57) ABSTRACT

Convenient and automatic methods are disclosed for reporting a violation of a do-not-call list. The only action required by the callee is to enter a predetermined touch tone pattern on their telephone key pad when they receive the call (e.g. pressing 999), and then hanging up. Network node(s) on the telephone network receive the touch tones and interpret the touch tone pattern as an indication of a violation of the do-not-call list. The network node stores the phone number of the caller, the callee number and the time of the call. The network node automatically generates and sends a notice of violation to the agency administering the do-not-call registry. In alternative embodiments, two network nodes may be involved in automatically generating and transmitting the notice of violation. The nodes may be nodes in a Signaling System 7 network.

9 Claims, 4 Drawing Sheets

MANUAL TRIGGERING OF AUTOMATED REPORTING OF DO-NOT-CALL LIST VIOLATION

BACKGROUND

1. Field of the Invention

This invention relates to the field of telephony and more particularly to a method and system for automatically reporting violations of national or state "do-not-call" lists.

2. Description of Related Art

A national "do-not-call" registry was implemented by the Federal Trade Commission (FTC) in the summer of 2003. The registry is a list of millions of phone numbers, representing both individuals and businesses owners, who have signed up to indicate that they do not want to receive unsolicited telephone calls by telemarketers. Telemarketers must periodically check their call lists against the numbers on the national do-not-call registry and remove or "scrub" their calling lists of telephone numbers that are on the registry. Telemarketers that continue to call numbers that are on the registry are subject to fines of up to $11,000 per violation. Some organizations are specifically exempted from complying with the do-not-call registry, including charities, non-profit organizations, organizations engaged in political solicitations, and sellers and telemarketers that either have a preexisting business relationship with the callee or prior express written authorization to call. In February, 2004, the FTC announced that over 55 million consumers had registered for the list. In addition to the Federal "do-not-call" list, many States have their own lists for their state residents.

The FTC provides a mechanism for reporting violations of the national do-not-call registry. Complaints can be filed with the FTC either electronically by email, by telephone, or by regular mail. Similar mechanisms for reporting violations of State do not call lists also exist. To file a complaint with the FTC, the phone number of the callee/registrant must have been on the do-not-call list for at least three months. The FTC also requires that the complainant provide the date the call was received and either the name of the organization or the telephone number that called the complainant. The FTC also requires the area code and phone number of the number that was called. The FTC has reported consumers had submitted some 150,000 complaints by the end of 2003. Fewer than 45 companies had been hit with more than 100 complaints, suggesting widespread compliance with the list, according to the FTC.

Despite the availability of these provisions, reporting a violation of the do-not-call list is at best inconvenient and adds further inconvenience to the annoyance of having received the call in the first place. In some instances, the task of reporting a violation can be impossible to perform since the callee may not know the name or phone number of the organization that placed the call. For example, telemarketers can hide their telephone number such that it does not show up on a caller ID screen on the callee's phone, or the caller may not correctly or completely identify themselves when they make their call and instead hang up when the callee asks for the name of the caller. Without the name or number of the telemarketer, the callee cannot submit a proper complaint to the FTC.

The present invention provides a much more convenient, and indeed automatic, method for filing a complaint of a do-not-call list violation. The only involvement required by the user is to enter a predetermined touch tone pattern on their telephone key pad (e.g. by pressing some predefined sequence of numbers on the phone, such as 999), and then hanging up. Network node(s) on the telephone network interpret the touch tone pattern as an indication of a violation of the do-not-call list and do the rest, including transmitting the complaint to the relevant agency. The network node will also know the phone number of the caller, the callee number and the time of the call. As such, the invention takes essentially all of the inconvenience out of the task of reporting violations. As more violations are reported, and enforcement of the registry increases, one would expect that the frequency of such violations would decrease.

Indeed, it has been recently reported on MSNBC news (Apr. 12, 2004) that telemarketers are taking a variety of steps to evade the do-not-call list, including masquerading as non-profit or survey organizations and using fine print on sweepstakes entry forms to give express authorization for marketers to call. See "Even the law can't stop all sales calls, Some marketers finding ways around Do Not Call list" Bob Sullivan, *MSNBC Business news*, Apr. 12, 2004, reported at http://www.msnbc.msn.com/id/4702892/. Both State and Federal agencies are urging consumers to file complaints even if the motivation for a call is unclear—if, for example, the calling firm convincingly claims it's a non-profit agency. State and Federal agencies cannot initiate an investigation unless consumers complain first. "If they sign something which results in a telemarketing call, and if the consumer doesn't call us and let us know this has occurred, we'll never know," says Jon Sorenson, spokesman for the New York State Consumer Protection Board. "We tell people even if confronted with gimmicks, still let us know about them." The present invention makes it easy for consumers to report these gimmicks.

SUMMARY OF THE INVENTION

In a first aspect, a system is provided for reporting a violation of a "do-not-call" list. The system is designed to automatically report violations of a do-not-call list, e.g., the national do-not-call list or a state do-not-call list, in response to receipt of predetermined touch tones entered by a user on their telephone when they receive a call in violation of the do-not-call list.

The system includes a node in a telephony network receiving one or more touch tones (e.g., DTMF tones) from the user. The touch tones are entered by a user via their telephone after receiving a telemarketing call in violation of a do-not-call list. For example, if a user receives a call in violation of the do-not-call list, they punch in or enter a predefined touch tone pattern for example by pressing 999 on the telephone key pad and then hanging up. The touch tone pattern (999) is then transmitted to the network node. The network node could be for example a telephone company switch, signaling system 7 service switching point, or other network entity, the details are not particularly important.

The system includes a memory either local or accessible to the node storing (1) caller identification information for the call (e.g., the phone number of the telemarketer that placed the call) and (2) time of call information for the telemarketing call, and optionally any other information pertaining to that call that would be necessary for filing a notice or complaint with an agency indicating a violation of a do-not-call list. An example of the optional additional information would be the name or phone number of the callee (the person instigating the complaint and entering the touch tone pattern 999), and the date they became registered on the do-not-call list. The caller identification information is typically present in a telephone network in order to properly route or place the call, regardless of whether or not the callee subscribes to Caller ID service.

The system further includes instructions executable at the node receiving the touch tones for automatically preparing a notice of violation of the do-not-call list and transmitting it to the agency receiving complaints. The transmission of the notice of violation is triggered by the receipt of the touch tone pattern (999) from the telephone, or in alternative embodiments, receipt of a message from some other network entity that the digits had been entered by the callee's phone. The notice of violation will typically contain the information stored in the memory, including the caller identification information (caller phone number), the time of the call and the phone number of the party that was called. The notice of violation could be transmitted electronically to the agency, for example as an email to the agency. The FTC and many State do-not-call agencies typically accept do-not-call violation notices via email. To automatically send such notices of violation, the node will be equipped with suitable email generating software and/or interface to the FTC violation reporting server that would extract the call information from memory, enter it into the body of the email in the proper fields, and send the email to the agency.

In one specific embodiment, the node that receives the touch tones from the user is also the node that also generates the notice of violation and automatically transmits the notice to the agency. This is not absolutely necessary. In an alternative embodiment, one node would receive the touch tone pattern from the user and then generate a message to a second node that indicates that the touch tone pattern was received, in which event the second node generates the notice of violation of the do-not-call registry and transmits it to the agency. An example of environment in which two separate nodes may be involved in the process of generating a notice of violation of a do-not-call list is a telephone network that uses a Signaling System 7 (SS7) network for call processing. The SS7 network nodes involved in the reporting do-not-call list violations are a Service Switching Point (SSP) and a Service Control Point (SCP).

Thus, in a related aspect of the invention, a system is provided for reporting a violation of a "do-not-call" list, comprising an SSP node and an SCP node, the nodes comprising nodes in a SS7 network. The SSP receives a predefined pattern of one or more touch tones entered by a user into a telephone during a telemarketing call in violation of a do-not-call list, with the pattern of touch tones predefined to be associated with a violation of the do-not-call list. The SSP includes a processor and instructions for responsively sending a message to the SCP indicating the receipt of the predetermined pattern of one or more touch tones. A memory accessible to the SCP stores (1) caller identification information (obtained from the public switched telephone network) and (2) time of call information for the telemarketing call, and any other information pertaining to the call that may be necessary for filing a notice with an agency indicating a violation of the do-not-call list. Software instructions are provided in the SCP for enabling it to prepare and transmit a notice of violation of the do-not-call list to the agency. The generation and transmission of the notice is triggered by receipt of the message from the SSP indicting receipt of the predetermined pattern of touch tones from the callee's telephone. The notice will include the information stored in the memory (caller phone number, time of call and callee phone number, plus any other additional required information such as possibly the date the callee became registered on the do-not-call registry, whether the callee is also registered on a State do-not-call list, etc.).

In another aspect of the invention, a method is provided of automatically reporting a do-not-call list violation, comprising the steps of receiving at a telephone network node a predetermined pattern of one or more touch tones from a telephone receiving a call in violation of a do-not-call list, the pattern of one or more touch tones entered by a user of the telephone when a call in violation of the do-not-call list is received; storing information identifying the source of the call and the time of the call; and automatically, in response to the receipt of the predetermined pattern of one or more touch tones, transmitting a complaint comprising a notice of violation of the do-not-call list to an agency receiving complaints of violation of the do-not-call list.

Alternatively, the method may involve a SS7 network and use two nodes, a SSP and SCP to report the do-not-call list violation. In the alternative embodiment, a method of automatically reporting a do-not-call list violation is provided comprising the steps of receiving, at an SSP, a predetermined pattern of touch tones from a telephone, the predetermined pattern of touch tones associated with an occurrence of a telemarketing call in violation of a do-not-call list; reporting the receipt of the predetermined pattern of touch tones to an SCP; storing information comprising the source of the telemarketing call, the time of the telemarketing call, and the recipient of the telemarketing call (and any other required information); and in response to the SSP reporting the receipt of the touch tone pattern, the SCP automatically transmitting a complaint comprising a notice of violation of the do-not-call list to an agency receiving complaints of violation of the do-not-call list.

DETAILED DESCRIPTION OF PREFERRED EMBODIMENT

Figure 1:
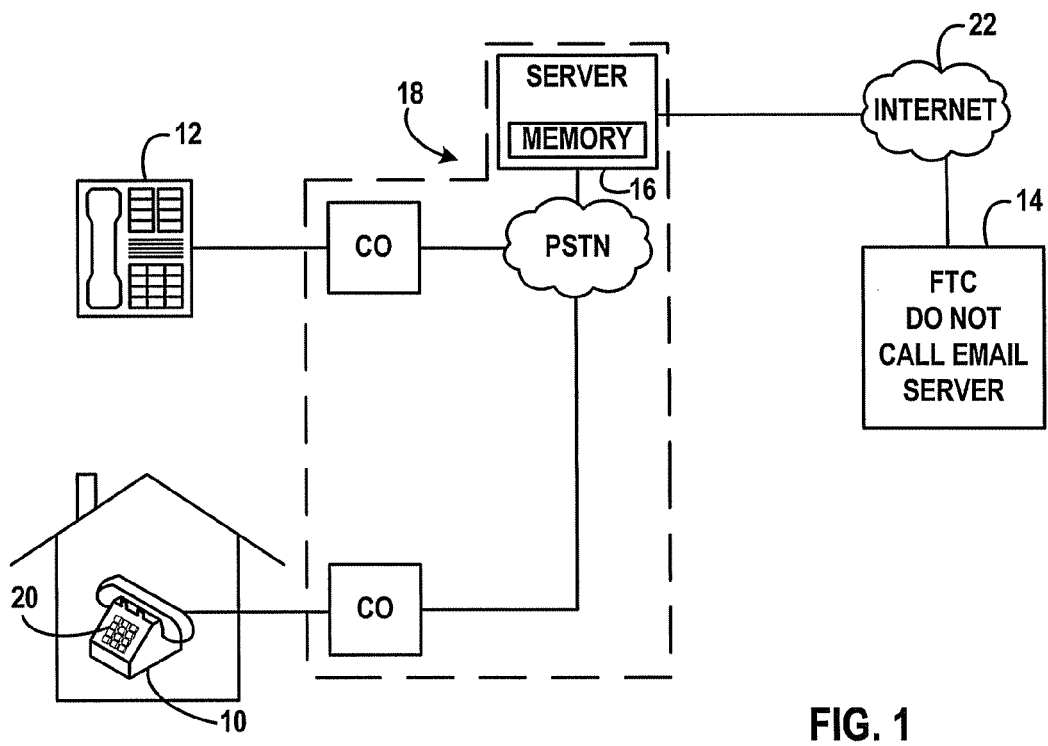
FIG. 1 is an illustration of a telephone network environment showing a telemarketer, the callee, and a network node (server) that receives touch tones input by the callee and responsively transmits a notice of violation of a do-not-call list to an agency receiving notices of violations, here the FTC.

FIG. 1 is an illustration of a system for automatically reporting a violation of a "do-not-call" list. The system is designed to automatically report violations of a do-not-call list, e.g., the national do-not-call list or a state do-not-call list, in response to receipt of predetermined touch tones entered by a user on their telephone 10 when they receive a call from a telemarketer 12 in violation of the do-not-call list. The notice of violation is submitted by a network node 16 directly to the relevant agency receiving complaints of such violations, for example the FTC. While the notice could be sent in one of several possible ways, including by printing a form with the information required to report the violation and mailing it to the FTC, in preferred embodiments the notice is sent by the node 16 in electronic form to the agency, such as by sending an email to the FTC where the email is received in the FTC email server 14.

In one possible embodiment, the node 16 is provided in a telephony network 18 and receives, either directly or indirectly, the predetermined touch tone pattern (e.g., DTMF tones) from the callee. The touch tones are entered by the callee via their telephone keypad 20 after receiving a telemarketing call in violation of a do-not-call list. For example, if a callee receives a call in violation of the do-not-call list, they punch in or enter a predefined touch tone pattern for example by pressing 999 on the telephone key pad and then hang up. The DTMF pattern (999) is transmitted to the network node 16. The node 16 includes DTMF tone detection circuitry, which is well known in the art. The network node 16 could be for example a telephone company server (as shown), telephone switch, signaling system 7 service switching point, or other network entity, the details are not particularly important.

In preferred embodiments, the system is set up by a telephone service provider which provides the service of reporting do-not-call list violations on behalf of subscribers. As such, the telephone service provider makes the features of this invention available to its subscribers and provides the necessary infrastructure in its network to (a) allow the subscribers to enter the touch tone phones, receive them, and recognize them as being a signal of receipt of a call in violation of the do-not-call list, (2) store call information for the call, including the source of the call by phone number or party name, the date and time of the call and the phone number of the callee, and (3) generate and transmit a notice of violation of the do-not-call list to the pertinent agency, such as the FTC or a state agency administering a state do-not-call registry. The precise manner in which these features are carried out by persons skilled in the art may vary. Several possible embodiments are disclosed herein.

The system of FIG. 1 includes a memory local to the node 16 (e.g., hard disk) storing (1) caller identification information for the call (e.g., the phone number of the telemarketer 12 that placed the call) and (2) time of call information for the telemarketing call, and optionally any other information pertaining to that call that would be necessary for filing a notice with an agency indicating a violation of a do-not-call list. An example of the optional additional information would be the phone number of the callee's phone 10 (the person instigating the complaint and entering the pattern 999), and the date they became registered on the do-not-call list. This information could be stored in the form of a database for calls placed to the telephone service's subscribers, stored locally at the node 16. Alternatively, this information could be stored on some other node or computer and accessed by, or transmitted to, the node 16. The database could also list the date the subscribers became registered on the national or state do-not-call registry, such that in the event that a subscriber presses the predetermined tone pattern but is not registered on the national do-not-call list, a violation is not reported to the FTC.

The caller identification information is typically present in a telephone network when the call is initially placed in order to properly route or place the call, regardless of whether or not the callee subscribes to Caller ID service. For example, the phone number of telemarketer's phone 12 could be extracted from the call when it is initially routed through the central office (CO) switch 22, and sent to the server 16 using known telephone signaling techniques. The server 16 could be dedicated to the task of reporting do-not-call list violations and receives such caller identification information every time the telemarketer phone 12 places a call to a subscriber phone 10 that is registered on the do-not-call list.

The system further includes instructions executable at the node 16 receiving the touch tones from phone 10 for automatically preparing and transmitting a notice of violation of the do-not-call list to the agency receiving complaints. The transmission of the notice of violation is triggered by the receipt of the touch tone pattern (999) from the telephone. The notice will typically containing the information stored in the memory, including the caller identification information (caller 12 phone number), the time of the call and the phone number that was called. The notice of violation could be transmitted electronically through an email to the agency over the Internet 22. The FTC and many state do-not-call agencies typically accept do-not-call violation notices via email. To automatically send such notices of violation, the node 16 will be equipped with suitable email generating software and/or interface to agency server that would extract the pertinent information from memory (time of call, caller number, callee number), enter it into the body of the email in the proper fields, and send the email to the agency email server 14.

Ideally, the do-not-call list violation is reported immediately to the agency, but this is not required. The notices of violation for a large group of subscribers could be processed in a batch, for example once per day.

Figure 2:
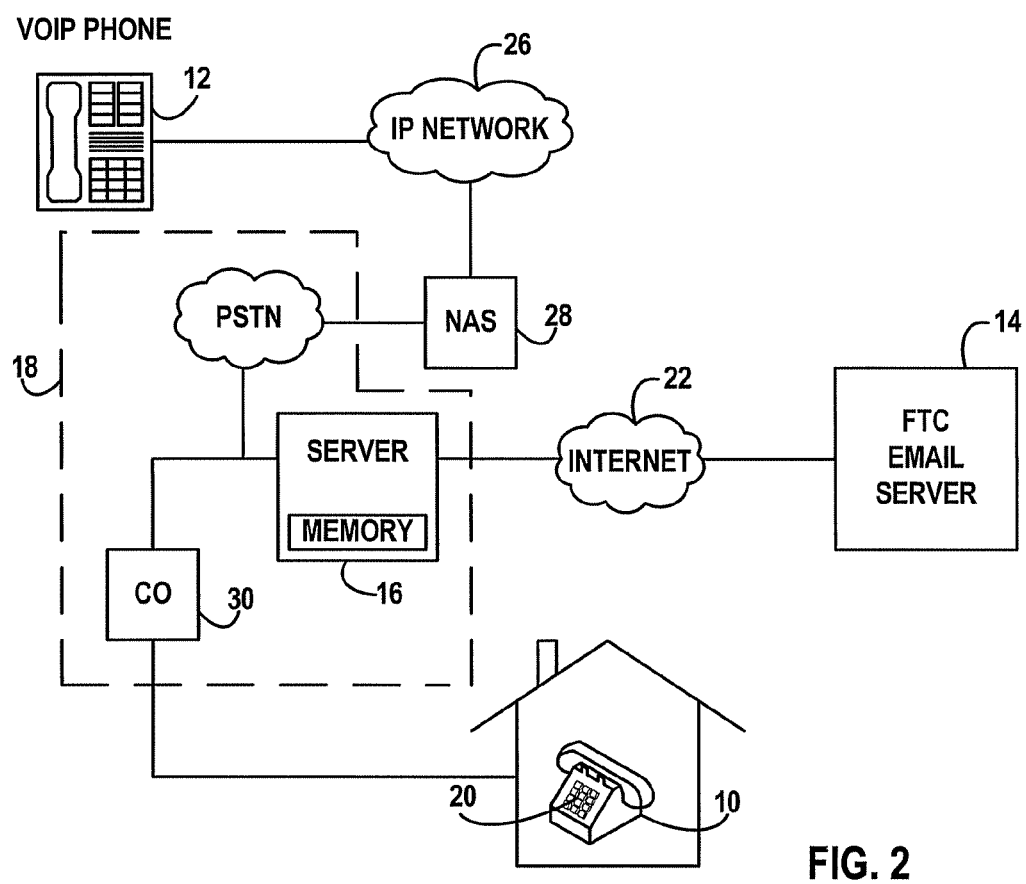
FIG. 2 is an illustration of an alternative telephone network environment in which the invention can be practiced.

FIG. 2 is an illustration of another possible network environment in which the invention could be practiced. The telemarketer 12 may use Voice-over Internet Protocol (VoIP) technology to place a call to the callee 10 over an IP network. The call is directed over an IP network 26 where the call is placed on a telephone network via a VoIP gateway shown as network access server 28. The call traverses the Public Switched Telephone Network (PSTN) 18 to a central office switch 30 and arrives at the callee phone 10. The callee receives the call, determines that it is a telemarketer, dials 999 and then hangs up. The DTMF tones for 999 are received at the network node 16 and interpreted as a call in violation of the do-not-call list. The node 16 maintains a memory storing a log of all calls placed to the subscriber 10, including caller ID information and the time of the call. When the node receives the 999 touch tone pattern, it responsively generates and sends an email complaint to the FTC email server 14 over the Internet 22.

In one possible embodiment, the touch tones could be received by one network entity, such as the central office switch 30 or network access server 28, and then a message would be sent by this node to the second node (server 16) which performs the task of generating the complaints to the agency. Detection of DTMF tones in a network access server is described in Baum et al., U.S. Pat. No. 5,577,105, incorporated by reference herein.

Figure 3:
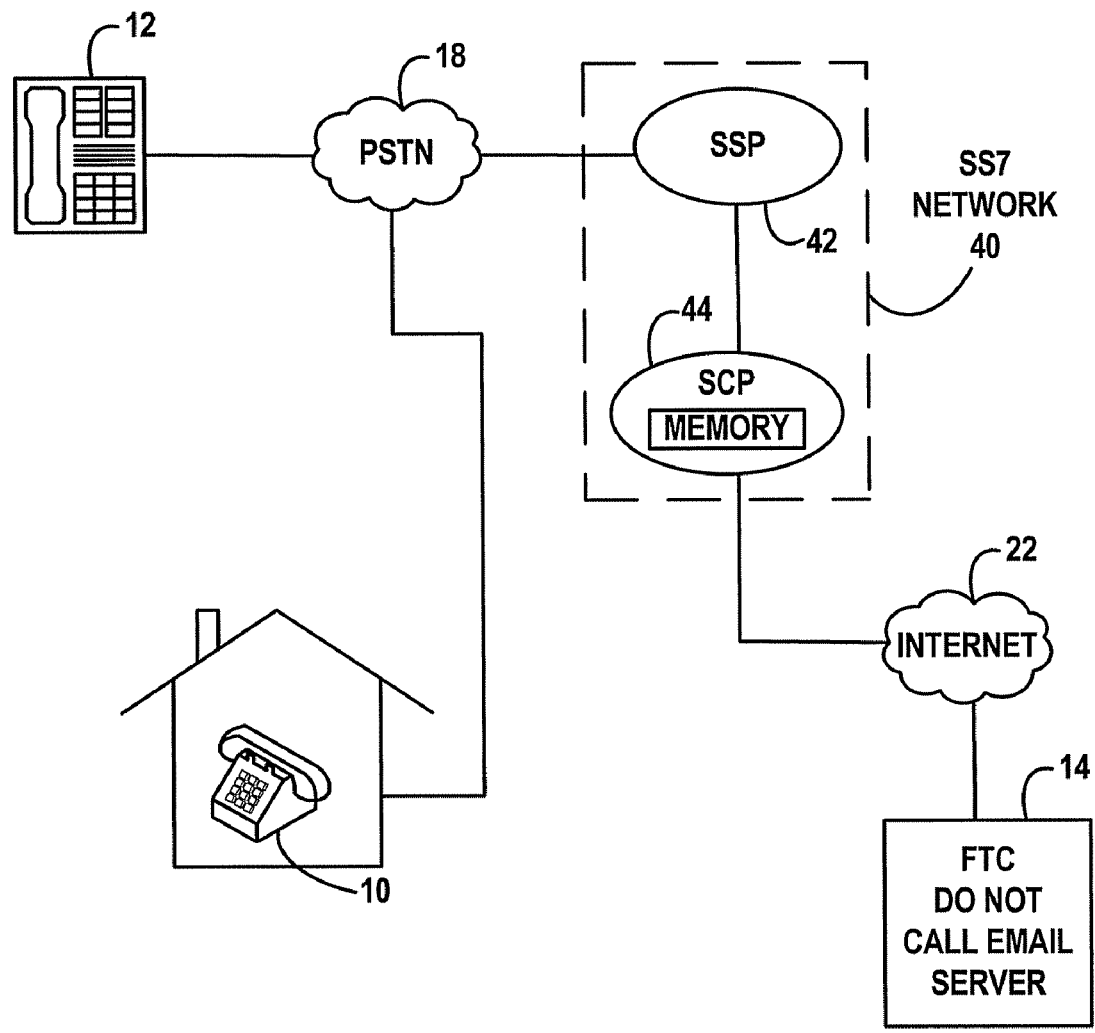
FIG. 3 is another alternative telephone network environment, in which nodes in a Signaling System 7 network are used together to generate and transmit a notice of violation of the do-not-call list to the relevant agency.

One further example of this possible architecture is shown in FIG. 3. In the embodiment of FIG. 3, routing of the call from the telemarketer phone 12 to the callee telephone 10 occurs via the PSTN network 18, but call information from the call is extracted and used by nodes in a SS7 network 40 to report a violation of a do-not-call list.

The telemarketer 12 places a call to callee's phone 10 via the PSTN 18. As is known in the art, the PSTN network makes use of the SS7 network 42 for certain signaling functions for fast call setup and transaction capabilities which deal with remote database interactions. SS7 is a global standard for telecommunications, and defines the procedures and protocol by which network elements in the public switched telephone network exchange information over a digital signaling network to affect wireless (cellular) and wireline call set up, routing and control. SS7 networks and protocols are used for basic call setup, management and teardown, wireless services such as PCS, roaming and mobile subscriber authentication, toll-free and toll wireline services, and enhanced call features such as call forwarding, caller ID and three-way calling. The call control part of the SS7 protocol is known as ISU-P (Integrated Services Digital Network User Part) which determines the procedures for setting up, coordinating and taking down trunk calls on the SS7 network. ISU-P further established a family of messages that are sent between switches, including Initial Address Message (IAM), Address Complete Message (ACM), and still others.

In the embodiment of FIG. 3, the predetermined DTMF tone pattern is entered in the callee phone 10 when a call in violation of the do-not-call list occurs. The tones are detected by an element in the PSTN and sent to the Service Switching Point (SSP) 42. Equivalently, a node in the PSTN could detect the DTMF tone pattern and simply send a message to the SSP 42. The SSP 42 communicates a message to the SCP 44 that the DTMF digits were entered. The SCP responsively sends a notice of violation of the do-not call list to the relevant agency, for example by sending an email over the Internet 22 to the FTC email server 14. The SCP will typically either store locally or otherwise access the information needed to place the complaint with the FTC, including the number of the calling party, the called party and the date of the call.

Figure 4:
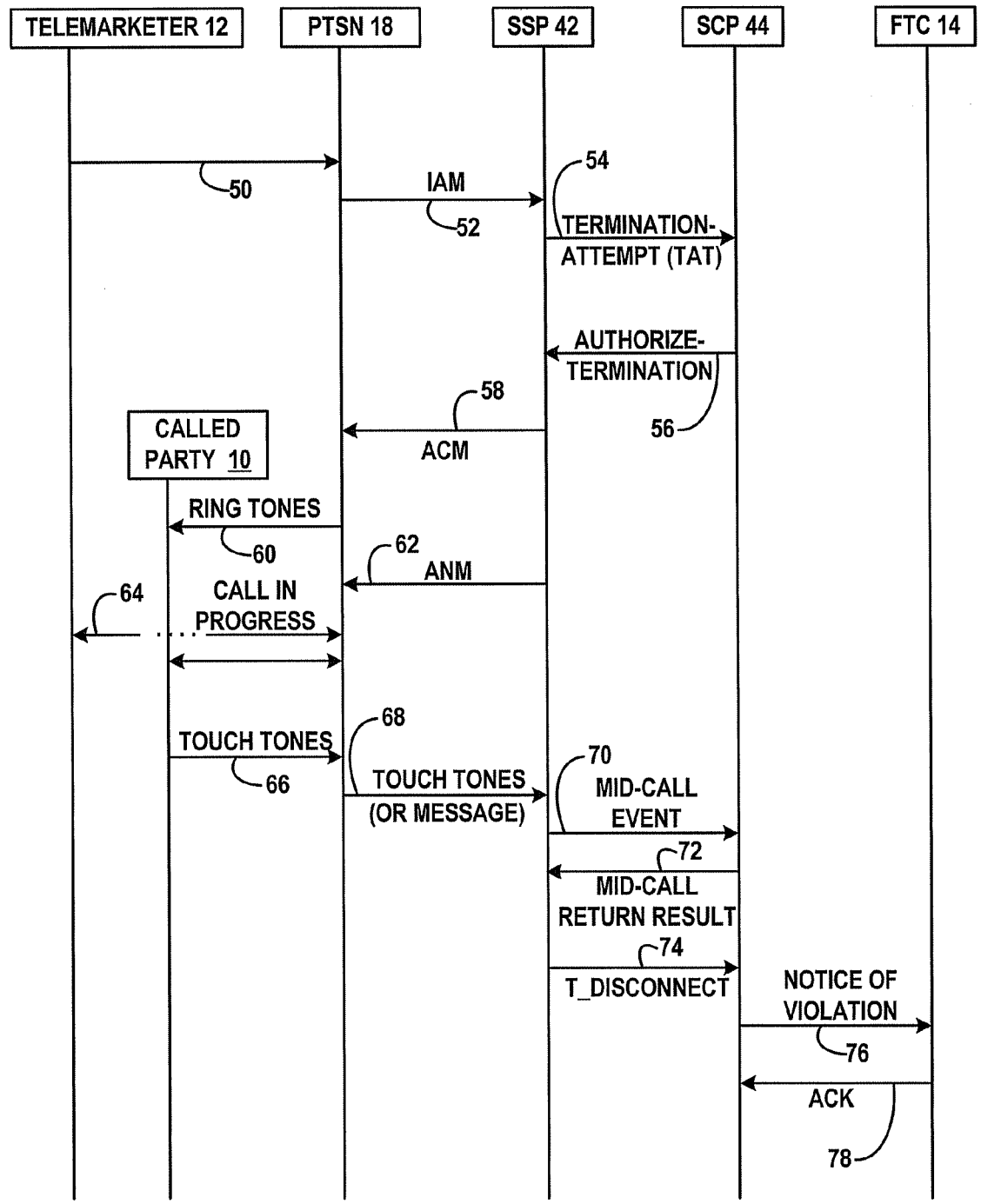
FIG. 4 is a call flow diagram showing the flow of message between the entities of FIG. 3 when a call in violation of the do-not-call list occurs and a complaint is sent to the agency.

A specific call flow showing how the system of FIG. 3 may be used to generate and transmit a do-not-call list violation in a presently preferred embodiment will be discussed now in conjunction with FIG. 4.

At step 50, the telemarketer phone goes off-hook and a call to the callee 12 is initiated by dialing the phone number of the callee.

At step 52, a node or switching point in the PSTN generates an ISU-P initial address message (IAM) and sends the message to the SSP 42. The SSP 42 is typically a SS7 network node that services the phone 10. The IAM includes the phone number of the called party and the phone number of the calling party. The SSP 42 consults a database and determines that called party 10 subscribes to an automatic do-not-call list violation reporting service.

At step 54, the SSP 42 sends a Termination_Attempt (TAT) message as specified in AIN0.2 (Advanced Intelligent Network release 0.2) standard to the SCP 44. The TAT message basically tells the SCP that called party 10 subscribes to the do-not-call list reporting service, and that if the called party enters the DTMF tone pattern that is a trigger that a violation should be reported to the relevant agency. The TAT message may also forward to the SCP the phone number of the calling party. The SCP 42 time stamps the call and records in its memory the time of the call, the phone number of the calling party and the phone number of the called party.

At step 56, the SCP 44 sends to the SSP 42 an AIN0.2 Authorize_Termination message with the Next Event List (NEL) parameter set to t_DTMF_entered. This message basically tells the SSP that if DTMF touch tones are received during the call (e.g., 999), the SSP is required to so inform the SCP. The SSP 42 is basically armed to detect the DTMF tone pattern and automatically send a responsive message to the SCP. Thus, messages 54 and 56 are an exchange of messages between the SCP and SSP establishing a relationship in which, upon the occurrence of receipt of a predetermined touch tone pattern by the SSP, a message indicating such receipt is to be sent from the SSP to the SCP.

At step 58, an Address Complete Message (ACM) is sent from the SSP to the PSTN. At step 60, ring tones occur on the phone 10. At step 62, after the answer on the telephone, the Answer Message (ANM) is send from the SSP 42 to the PSTN.

At step 64, the call is in progress between the telemarketer 12 and the called party phone 10. When the called party determines that the call is from a telemarketer in violation of the do-not-call list, the called party enters the DTMF tones on the keypad of the phone 10 and hangs up. This is indicated at step 66, indicating that the tone pattern is transmitted from the phone to the PSTN.

At step 68, a node in the PSTN detects the tones and either relays the tones directly to the SSP 42 (possibly encapsulated in some other message or packet) or transmits a message to the SSP 42 that the tone pattern was detected.

At step 70 the SSP 42 sends a T_DTMF_Entered message to the SCP 44 with the field DTMFDigitsDetected filled in with the detected tone pattern (999).

At step 72, the SCP 44 sends a Continue message to the SSP 42 basically indicating that it received the T_DTMF_Entered message and that the Next Event List event occurred, namely, the receipt of the touch tone pattern associated with a do-not-call list violation.

At step 74 the hang up of the phone 10 is reported to the SCP 44 as indicated.

At step 76, the SCP 44 generates a notice of violation of the do-not-call list and sends the notice of violation to the relevant agency. The SCP will have recorded in memory the phone number of the called party, the phone number of the calling party and the time and date of the call, and include this information in the body of an email that it sends automatically to the FTC. The SCP 44 could optionally consult a database correlating the calling party phone number to the name or classification of the entity to insure that if the calling party is exempt from the do-not-call registry (e.g., it is a charity or a non-profit organization), then a violation is not reported. The occurrence of the transmission of the notice of violation is preferably stored in a database either locally in the SCP 44 or elsewhere in the SS7 network.

At step 78, the FTC sends an acknowledgement of the reporting of the violation.

Figure 5:
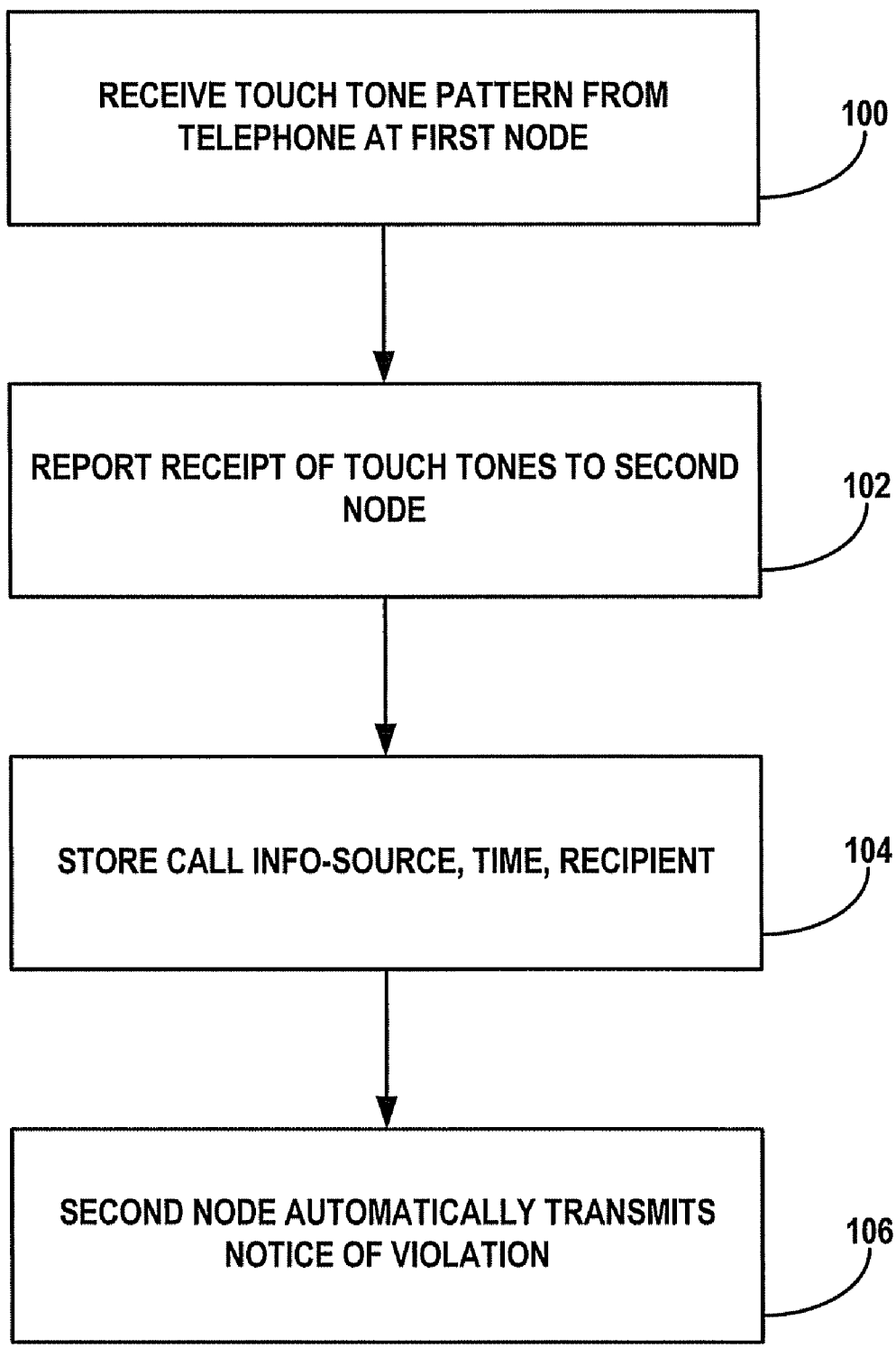
FIG. 5 is a block diagram showing the processing steps in one embodiment of reporting a do-not-call list violation to a regulatory agency such as the FCC.

The above method is shown in flow chart form in FIG. 5. At step 100, a touch tone pattern from the telephone receiving the call in violation of the do-not-call list is received at a first node (SSP). At step 102, the receipt of this touch tone pattern is reported to a second node (SCP). At step 104, the SCP stores call information needed to report a violation, i.e., source of the call, time (date) of the call, and the party that was called. At step 106, the second node (SCP) automatically transmits the notice of violation to the do-not-call regulatory agency (e.g., FCC).

The telephone service provider for the called party 10 could access the database recording the instances in which do-not-call list violations are sent to the FTC. The telephone service provider could provide to the called party 10 with a notice of all of the violations that were reported on its behalf. This notice could be provided on their monthly bill, or alternatively on-line for example on a web page showing the called party's account and the do-not-call list violations that were reported. As noted, additional mechanisms could be used to report violations, such as through automated recorded messages with pertinent information, printed reports that are mailed, or otherwise. Batch reporting can also be used, in any convenient form, such as email, or paper reports.

While presently preferred and alternative embodiments have been set forth, persons skilled in the art will appreciate that variation from the disclosed embodiments can be made without departure from the scope of the invention. For example, the specifics of the messaging format between the PSTN and nodes in the SS7 network in of FIG. 4 could be modified to suit other implementations. Furthermore while the telephone 10 has been illustrated in the drawings as a conventional "black telephone", the phone could take the form of a personal computer equipped with telephony software (e.g., Megaphone™), wireless phone, telephony switchboard in a business, or any other device that includes telephone functionality; accordingly the term "telephone" is to be interpreted broadly to cover such devices. The true scope of the invention is to be determined by reference to the appended claims.

The invention claimed is:

1. A system for reporting a violation of a "do-not-call" list, comprising:
    a service switching point and a service control point, said service switching point and service control point comprising nodes in a Signaling System 7 network;
    said service switching point receiving a predefined pattern of one or more touch tones, said touch tones entered by a called party into a telephone during a telemarketing call in violation of said do-not-call list, said pattern of touch tones predefined to be associated with a violation of said do-not-call list;
    said service switching point containing a processor and instructions for responsively sending a message to said service control point indicating the receipt of said predetermined pattern of one or more touch tones;
    a memory accessible to said service control point storing (1) caller identification information and (2) time of call information for said telemarketing call and any other information pertaining to said call necessary for filing a notice with a regulatory agency not affiliated with the source of the telemarketing call indicating a violation of said do-not-call list;
    instructions executable by said service control point for preparing and transmitting a notice of violation of said do-not-call list to said agency, said preparing and transmitting of said notice triggered by receipt of said message from said service switching point indicting receipt at the service switching point of said predetermined pattern of touch tones from said telephone, said notice containing said caller identification and time of call information stored in said memory.

2. The system of claim 1, wherein said complaint is filed electronically with said agency.

3. The system of claim 1, wherein said do-not-call list comprises a national do-not-call list.

4. The system of claim 1, wherein said do-not-call list comprises a state do-not-call list.

5. A method of automatically reporting a do-not-call list violation, comprising the steps of:
    receiving, at a first node, a predetermined pattern of touch tones from a telephone during an ongoing telemarketing call in violation of a do-not-call list, said predetermined pattern of touch tones associated with an occurrence of a telemarketing call in violation of a do-not-call list;
    transmitting the receipt of said predetermined pattern of touch tones at said first node to a second node;
    storing information comprising the source of the telemarketing call, the time of the telemarketing call, and the recipient of the telemarketing call; and
    in response to said reporting to said second node, said second node automatically reporting a complaint comprising a notice of violation of said do-not-call list to a regulatory agency not affiliated with the source of the telemarketing call receiving complaints of violation of said do-not-call list.

6. The method of claim 5, wherein said complaint is filed electronically with said agency.

7. The method of claim 5, wherein said do-not-call list comprises a national do-not-call list.

8. The method of claim 5, wherein said do-not-call list comprises a state do-not-call list.

9. The method of claim 5 wherein said first node comprises a service switching point in a signaling system 7 network and said second node comprises a service control point in said signaling system 7 network.

* * * * *